United States Patent
Isaac et al.

(10) Patent No.: US 7,559,833 B2
(45) Date of Patent: Jul. 14, 2009

(54) ADJUSTABLE CONVERGENCE PANELS FOR DISCHARGING RESIDUE FROM A COMBINE HARVESTER

(75) Inventors: Nathan E. Isaac, Leola, PA (US); Andrew V. Lauwers, Stevens, PA (US)

(73) Assignee: CNH America LLC, New Holland, PA (US)

( * ) Notice: Subject to any disclaimer, the term of this patent is extended or adjusted under 35 U.S.C. 154(b) by 49 days.

(21) Appl. No.: 11/823,900

(22) Filed: Jun. 29, 2007

(65) Prior Publication Data

US 2009/0005137 A1    Jan. 1, 2009

(51) Int. Cl.
*A01F 12/30* (2006.01)
(52) U.S. Cl. ..................................... 460/111
(58) Field of Classification Search ............. 460/111, 460/112, 9; 241/243, 186.3, 101.75, 416; 56/10.2 R
See application file for complete search history.

(56) References Cited

U.S. PATENT DOCUMENTS

| | | | | |
|---|---|---|---|---|
| 3,543,491 | A | 12/1970 | Lausch | 56/192 |
| 3,803,821 | A | 4/1974 | Peacock et al. | 56/192 |
| 3,881,301 | A | 5/1975 | Sawyer et al. | 56/14.4 |
| 4,056,107 | A | 11/1977 | Todd et al. | 130/27 R |
| 4,344,443 | A * | 8/1982 | De Busscher et al. | 460/97 |
| 4,532,941 | A | 8/1985 | Gauthier | 130/27 R |
| 4,535,788 | A * | 8/1985 | Rowland-Hill et al. | 460/9 |
| 4,548,214 | A * | 10/1985 | Sheehan et al. | 460/9 |
| 4,557,276 | A * | 12/1985 | Hyman et al. | 460/9 |
| 4,614,197 | A * | 9/1986 | Weber et al. | 460/112 |
| 4,677,991 | A * | 7/1987 | Harris et al. | 460/8 |
| 4,897,071 | A * | 1/1990 | Desnijder et al. | 460/10 |
| 5,558,576 | A * | 9/1996 | Meyers | 460/99 |
| 6,582,298 | B2 * | 6/2003 | Wolters | 460/97 |
| 6,908,379 | B2 | 6/2005 | Gryspeerdt et al. | 460/111 |
| 7,001,269 | B2 | 2/2006 | Weichholt | 460/112 |
| 7,066,810 | B2 | 6/2006 | Farley et al. | 460/112 |
| 2005/0282602 | A1* | 12/2005 | Redekop et al. | 460/112 |
| 2007/0037620 | A1 | 2/2007 | Anderson et al. | 460/111 |

FOREIGN PATENT DOCUMENTS

DE    19535424    9/1995
JP    8154469    6/1996

* cited by examiner

*Primary Examiner*—Árpád Fábián-Kovács
(74) *Attorney, Agent, or Firm*—Michael G. Harms; John William Stader; Patrick M. Sheldrake

(57) ABSTRACT

A convergence panel construction for an agricultural combine that permits a user to adjust or controllably vary to some extent, depending upon whether windrowing or swath spreading of crop residue is desired, lateral flow concentration or dispersion of the crop residue flow as the crop residue flow is directed towards the rear of the combine and into a distribution chamber for discharge therefrom either through a rear opening for windrowing or into a chopper/spreader for swath spreading, including adjustable convergence panels hingedly attached to the sides of the distribution chamber for rotation about the hinged attachments and a positioning assembly therefor, which positioning assembly includes an adjustment mechanism, such as a linkage connected to the convergence panels, for adjustably moving such convergence panels about the hinged attachments and a controller mechanism operable by a user to effect the movement of such right and left convergence panels through operation of such adjustment mechanism.

25 Claims, 15 Drawing Sheets ial combine, and more particularly to the provision of a convergence panel construction having adjustable convergence panels and the use thereof in directing the flow of crop residue from the threshing and separating area of a combine to either a crop residue handling system or outwardly from the rear of the combine in a windrowing configuration.

ADJUSTABLE CONVERGENCE PANELS FOR DISCHARGING RESIDUE FROM A COMBINE HARVESTER

TECHNICAL FIELD

The present invention relates generally to a system and method for discharging crop residue from an agricultural combine, and more particularly to the provision of a convergence panel construction having adjustable convergence panels and the use thereof in directing the flow of crop residue from the threshing and separating area of a combine to either a crop residue handling system or outwardly from the rear of the combine in a windrowing configuration.

BACKGROUND ART

Axially arranged rotary threshing or separating systems have long been in use in agricultural combines for threshing crops to separate grain from crop residue, also referred to as material other than grain (MOG). Such axially arranged systems typically include at least one cylindrical rotor rotated within a concave or cage, the rotor and surrounding concave being oriented so as to extend forwardly to rearwardly within the combine.

In operation, crop material is fed or directed into a circumferential passage between the rotor and the concave, hereinafter referred to as a rotor residue passage, and is carried rearwardly along a generally helical path in such passage by the rotation of the rotor as grain is threshed from the crop material. The flow of crop residue or MOG remaining between the rotor and concave after threshing is typically discharged or expelled by the rotating rotor at a rear or downstream end of the rotor and the rotor residue passage in a generally downward, or a downward and sidewardly, direction in what is a continuation of the helical path of movement of the crop residue within the rotor residue passage between the rotor and concave.

The flow is typically discharged into a discharge opening at the downstream end of the rotor and into a further passage, hereinafter referred to as a discharge passage, that extends downwardly and somewhat rearwardly into a crop residue distribution system located below and rearwardly of the rear end of the threshing system. The crop residue distribution system typically includes a rotary beater or chopper or other apparatus that beats or chops the residue into smaller pieces and propels that finer crop residue rearwardly towards an area within the rear end of a combine, hereinafter referred to as a distribution chamber. The crop residue provided to the distribution chamber may be either discharged therefrom onto a field as a windrow or directed into a crop residue handling system that typically includes a chopper and spreadboard or residue spreader, hereinafter referred to generally as a chopper/spreader, mounted on or at the rear end of the combine and operable for spreading the residue over a swath of a field.

Windrowing typically occurs when, under certain conditions and in certain localities, users desire to retain the crop residue for post-processing. In such cases, the residue, which may be chopped or un-chopped, is discharged from the combine, without entering the chopper/spreader, to form a windrow directly behind the combine. Such windrow may contain only straw residue or both straw residue and chaff, and may typically be produced by moving the chopper/spreader to a position such that the residue flow will not enter the chopper/spreader or by the opening of a door at the rear of the combine. Consequently, the windrow may be formed in front of the chopper/spreader, such as when the chopper/spreader is moved out of the flow path of the crop residue from the distribution chamber, or by expulsion of the residue flow over the top of the chopper/spreader, such as when the crop residue is discharged through a rear opening from the distribution chamber.

With some combines, a chop/swath door or guide mechanism has been utilized to properly direct the crop residue from the distribution chamber. Chop/swath door mechanisms typically include a windrow door and may sometimes also have an additional deflector/kickback door associated therewith, and are employed to selectively control whether the crop residue is permitted to flow over the top of the chopper/spreader towards and through the rear opening for windrowing or is directed downwardly towards the chopper/spreader for swath spreading. When the crop residue is to be discharged through the rear opening onto a field to form a windrow on the field, the windrow door at the rear of the combine is typically caused to open and the deflector/kickback door, if one is employed, is caused to move into a position to prevent the discharge of crop flow into the chopper/spreader and to deflect the flow over the chopper/spreader towards the rear opening made accessible by the opening of the windrow door. When the crop residue is instead to be discharged into the chopper/spreader for swath spreading, the windrow door is caused to close and the deflector/kickback door, if one is employed, is caused to move to a position that permits the crop flow to be directed into the chopper/spreader. For purposes of further discussion herein, operation of a windrow door should be understood to also include corresponding operation of a deflector/kickback door if such a deflector/kickback door is employed, but the details of the corresponding operation of such a deflector/kickback door, which details are well known, will not be further specifically addressed or described herein.

When the crop residue is to be discharged onto a field to form a windrow on the field, such as through a rear opening from the distribution chamber, it is preferred that the flow being directed towards the rear opening be distributed about a center line through the rear opening to facilitate the formation of a cohesive windrow, whereas, when the crop residue is to be spread over a swath of the field, especially by a spreader having counter-rotating paddles for throwing the crop residue sidewardly in an extended swath, it is preferred that the flow being directed to the spreader be concentrated towards the center of the residue spreader for optimum spreader performance. Such dichotomy has necessarily resulted in various trade-offs in the manner in which crop residue is directed towards the rear of the combine, with the result that the flow distribution and quality is often less than is desired for either or both of the windrowing and spreading alternatives.

Several manufacturers of combine harvesters have utilized fixed convergence panels to control to some extent the trajectory and directional disposition of the flow of crop residue that is expelled or discharged from the threshing rotor and directed through the distribution chamber. Generally, such convergence panels have been installed in fixed positions to effect a convergence at the exit from the fixed convergence panels of the crop residue flow towards the centerline of the combine, which is beneficial for swath spreading by the chopper/spreader, but not for windrowing, as will be further discussed herebelow. The windrow doors of such constructions have typically been pivotable about a generally horizontal axis and operable either, in an open condition, to reveal or open the rear opening from the distribution chamber to allow the converged residue flow to exit the combine or, in a closed condition, to occlude or block the rear opening and to effect the direction of the converged residue flow towards the chopper/spreader. The problem encountered with such constructions has been that, for many applications, especially for windrowing operations and when high volumes of crop residue are being passed to the rear of the combine, the exit from such fixed convergence panels has been too small to adequately handle the crop residue flow being funneled therethrough, sometimes resulting in the formation of a plug at the exit and/or blockage of residue flow. The narrow exit that is desirable for concentrating the residue flow for introduction into the chopper/spreader for swath spreading is undesirable for windrowing, for which a wide exit would be preferred.

Accordingly, what has continued to be sought is a construction that permits a user to better and adjustably direct and control the lateral flow concentration or dispersion of the crop residue flow, depending upon whether windrowing or swath spreading of crop residue is desired, as the crop residue flow is directed for discharge as a windrow or into the spreader for spreading in a swath on the field.

SUMMARY OF THE INVENTION

What is disclosed herein is thus a convergence panel construction that permits a user to adjust or controllably vary to some extent, depending upon whether windrowing or swath spreading of crop residue is desired, lateral flow concentration or dispersion of the crop residue flow as the crop residue flow is directed towards the rear of the combine for either discharge from the distribution chamber for windrowing or discharge from the distribution chamber into a chopper/spreader for swath spreading. Such convergence panel construction includes convergence panels adjustably positionable within the distribution chamber of a combine, ahead of a windrow door, and a positioning assembly therefor. The convergence panels include right and left side panels that are preferably disposed generally symmetrically about the center line of the combine and attached at or near their forward ends at or to respective sides of the distribution chamber. Preferably, such attachment is a generally vertically pivot or hinged attachment such that one or both of such right and left side panels can be rotated about the generally vertical axis of such hinged attachment to alter the lateral opening between the right and left panels at their back or trailing ends. The positioning assembly includes an adjustment mechanism, such as a linkage connected to the panels, for moving such panels about the hinged attachments and a controller mechanism operable by a user to effect the movement of such right and left panels through operation of such adjustment mechanism.

Such construction may also include a positioning guide portion, such as may be formed by complementarily engageable elements of the right and left panels and the top of the distribution chamber, which positioning guide portion can include a top sheet with slots or other positioning forms or features positioned above the convergence panels and guide pins, extensions, or flanges at or near the tops of the convergence panels for guiding the movement of the left and right panels when hinged movement thereof is effected through the linkages.

The windrow door, which is typically mounted to be pivotable about a generally horizontal axis to open and close, may have side door panels associated therewith extending towards the sides of the rear opening that becomes exposed by the opening of the windrow door. Preferably, such side door panels are formed and attached in such a manner that the forward or leading ends of such side door panels will extend forwardly to overlap the outer sides of the right and left convergence panels at their back or trailing ends and will be laterally movable to some extent. The forward or leading ends of such side door panels thus fit outside the back or trailing ends of the convergence panels to provide a shingling effect and may be movable with the convergence panels to define and provide a channel passage from the distribution chamber to and through the rear opening exposed by the opening of the windrow door in order to facilitate the smooth transitioned flow of the crop residue from the distribution chamber out of the rear opening for windrowing on the field. Such side door panels may optionally be attached or connected or linked to the convergence panels, such as by linkage assemblies or connectors, so that they and the convergence panels are moved in unison as the windrow door is operated, or they may be biased by gravity or by additional biasing members to abut the outer sides of the adjustable convergence panels and to be movable therewith. Operation of the windrow door may be effected either directly manually or through a door control assembly such as a control assembly remotely operable by a user.

Somewhat similarly, in situations when it is desired that a residue spreader be attached at the rear of the combine, such residue spreader may be fitted with infeed plates that may be either fixed in position or adjustable to accommodate and interact with the convergence panels to define and provide a channel passage to such residue spreader to facilitate the smooth transitioned flow of the crop residue to such residue spreader.

Optionally, the convergence panels may have one or more hinge joints formed and extending generally along their lengths to permit the exit formed by the adjustable convergence panels and from such convergence panels to be configured to have various geometric shapes according to equipment requirements or considerations and desires of the user. For example, with multiple hinge joints, exits having hexagonal or octagonal cross sections can be readily provided.

The convergence panels, as well as the other panels utilized to form the channel for the crop residue flow, may, but need not be, formed of multiple sections or materials, such as alternating steel and rubber sections, to provide greater flexibility and to facilitate the formation of an exit opening having a desired geometry. Depending upon the materials employed for the separate sections and the interconnection requirements therefor, the sections may be joined to one another in overlapping arrangements that permit and provide for the smooth flow of crop residue therealong without the introduction in the formed flow channel of obstructions or section joinder elements that could impede the flow of the crop residue and effect flow blockages.

With many convergence panel construction embodiments the convergence panels can be operated in unison to position the convergence panels in a desired configuration and to control the lateral flow concentration from the distribution chamber. In certain convergence panel construction embodiments, the convergence panels may also be so mounted in the distribution chamber and so operable as to permit the convergence panels and the exit defined or formed thereby to be shifted laterally to the left or right to better control the windrow formation. Thus, in some instances and with some convergence panel construction embodiments, the positioning assembly may include linkages that permit and provide for independent control or movement of the separate convergence panels or sections thereof in addition to or instead of unified control or movement.

Preferably, however, the control mechanism of the positioning assembly will be operable to effect in a single adjustment operation the positioning of the convergence panels and windrow side door panels, and, with some convergence panel construction embodiments, other elements or components as well, to form a desired configuration. Such a unified adjustment operation serves to minimize the time required to convert the convergence panel construction from a windrowing configuration to a spreading configuration or from a spreading configuration to a windrowing configuration, especially when the controller mechanism of the positioning assembly is remotely actuatable by a user, such as by a user in the cab of the combine.

DETAILED DESCRIPTION OF THE INVENTION

Figure 1:
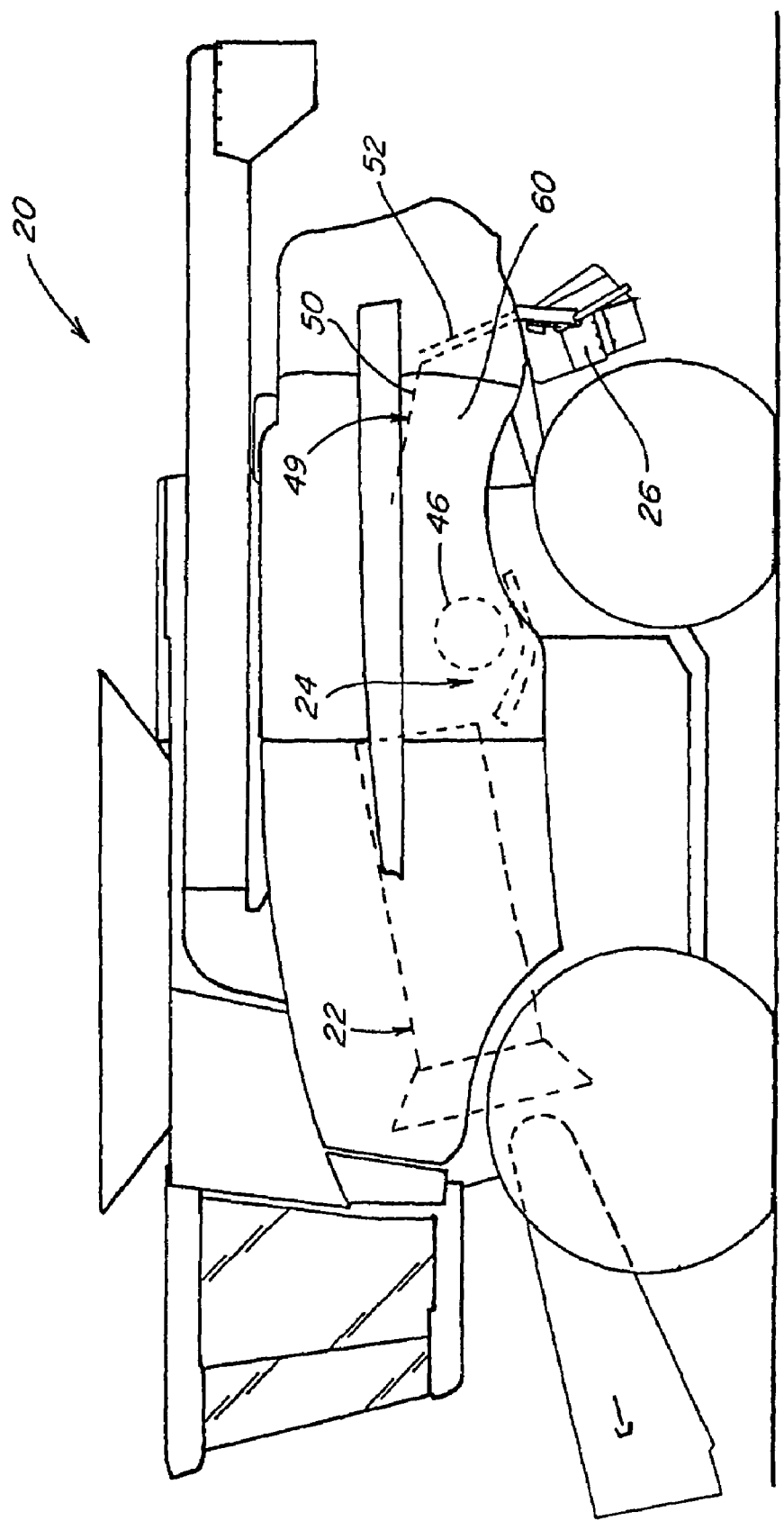
FIG. 1 is simplified side plan view of an agricultural combine, illustrating in dotted lines an axially arranged threshing system of the combine.

Referring now to the drawings, wherein like numerals refer to like or similar items or features, FIG. 1 depicts a representative agricultural combine 20 that includes an axially arranged threshing system 22 and a crop residue distribution system 24 that includes a beater or chopper 46, all of well known construction and operation.

Figure 2:
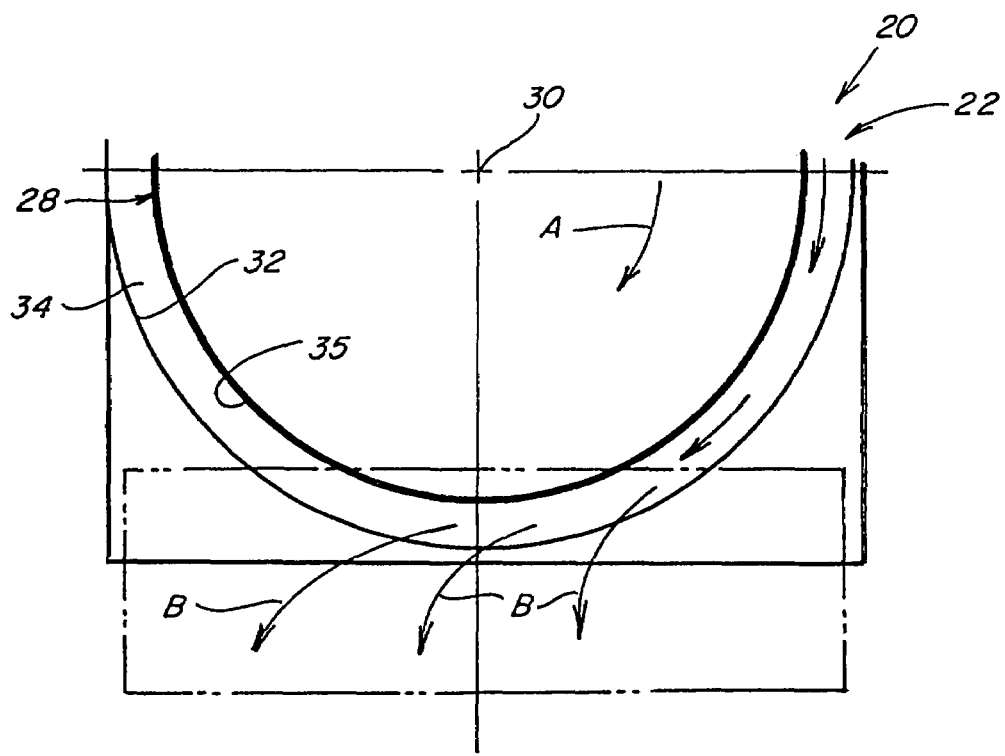
FIG. 2 is a simplified plan view at the rear of the rotor of the combine of FIG. 1, showing the threshing system and illustrating a path of crop residue flow expelled from the threshing system and directed towards the rear of the combine.
Figure 3:
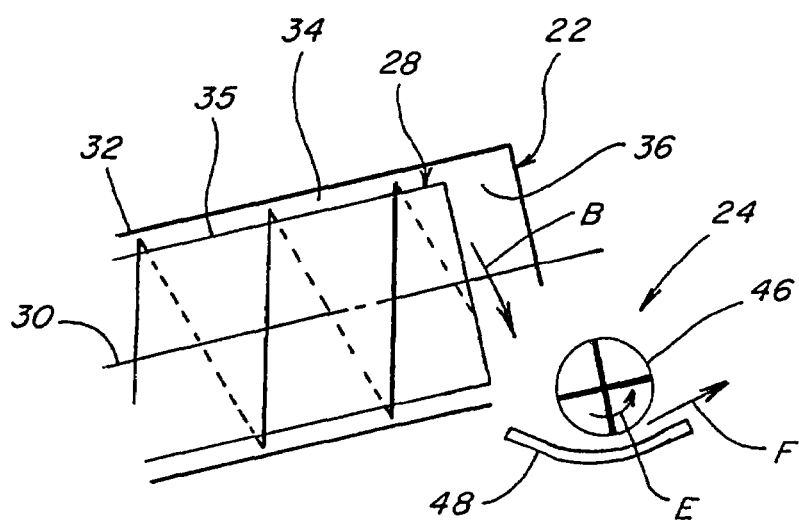
FIG. 3 is a simplified side plan view of the threshing system and the crop residue distribution system.

As can be generally and essentially observed from a review and study of FIGS. 1-4, threshing system 22 is axially arranged in that it includes a cylindrical rotor 28 conventionally supported and rotatable in a predetermined direction, with arrow A in FIG. 2 denoting a typical clockwise, or forward, rotation, about a rotational axis 30 therethrough and within a concave 32, for conveying a flow of crop material in a helical flow path through a space 34 extending circumferentially around an outer cylindrical surface 35 of rotor 28 and an inner circumferential surface of concave 32. As the crop material is moved through space 34, the crop, such as grain, legumes, or the like, will be loosened and separated from crop residue such as husk and pods, and carried away therefrom in the well known conventional manner. The crop residue will continue along a helical path through space 34, and will be discharged or expelled therefrom, as denoted by arrows B, into a discharge opening and through a discharge passage 36 (FIG. 3), which essentially comprises an extension of space 34 at the downstream end of rotor 28.

Crop residue distribution system 24 will typically include a rotary device 46, such as a beater or chopper, rotatable in a direction E (FIG. 3) above a concave pan 48. Device 46 typically rotates at a rapid speed, so as to be capable of accelerating and propelling a flow of crop residue rearwardly within the confines of the rear end of combine 20, as generally denoted by arrows F. Such rearward flow is typically guided and directed by a guide mechanism 49 (FIG. 1), which may include internal panels or shields, representationally denoted by shields 50 and a windrow door 52, so as to flow into a distribution chamber 60 and, depending upon whether the windrow door 52 is closed or open, to be provided from distribution chamber 60 either into a crop residue chopper and/or spreader, such as chopper/spreader 26, hereinafter referred to as a spreader, for swath spreading or, as further addressed hereinafter, through a rear opening 54 (FIG. 4) for windrowing.

Figure 4:
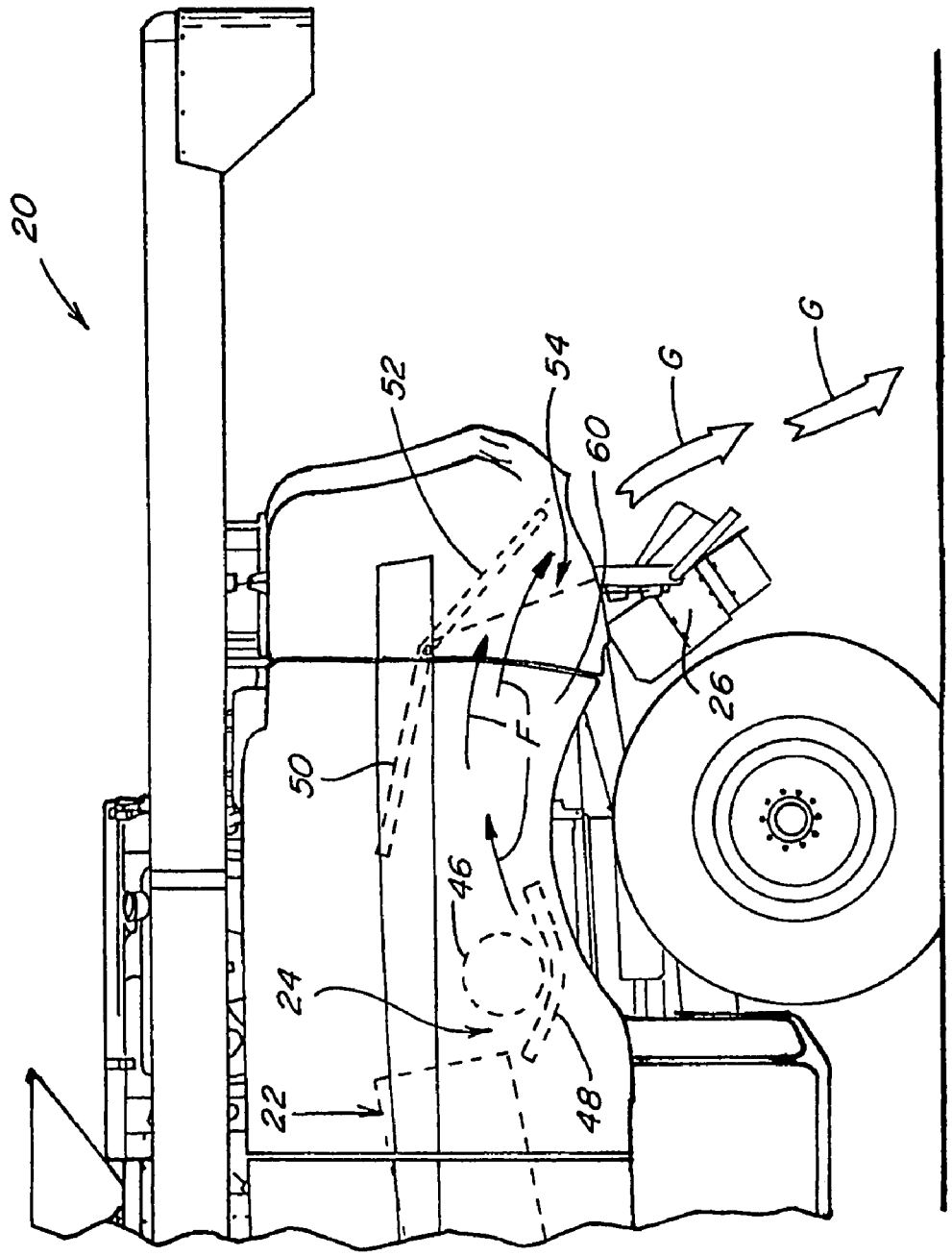
FIG. 4 is a simplified side plan view similar to the view of the rear end portion of the combine presented in FIG. 1, but representationally depicting the windrow door in an open position with the spreader in its windrowing position.
Figure 5:
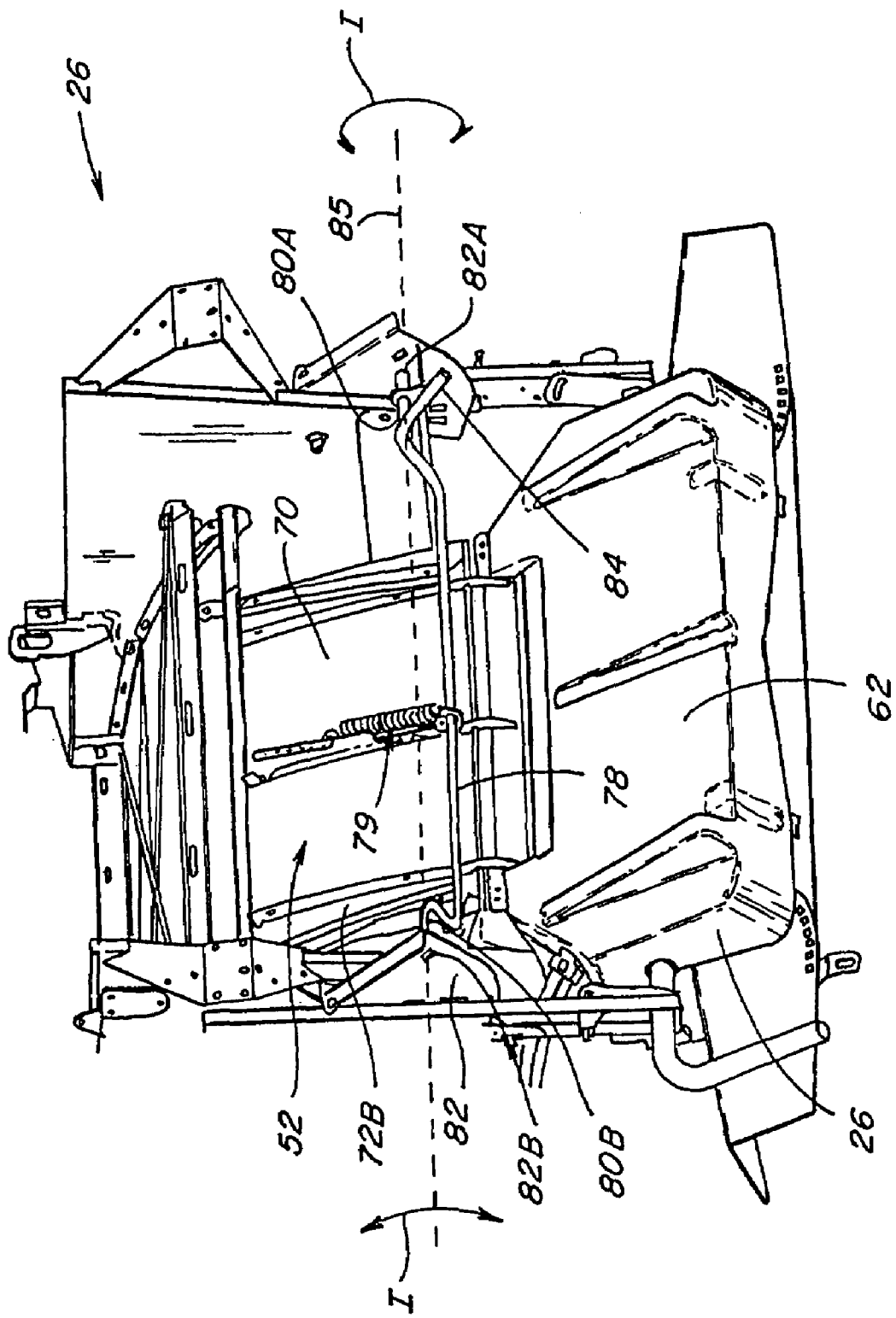
FIG. 5 is a rear perspective view showing the windrow door in a closed position with the spreader in its spreading position.

As shown in FIGS. 1 and 5, which depict the windrow door 52 in a closed position with spreader 26 disposed for spreading, when windrow door 52 is closed, the crop residue flow to the distribution chamber 60 cannot exit through the rear opening of the combine and therefore is instead directed to a crop residue handling system, such as spreader 26 and the spreader feed area at the input thereto, for swath spreading thereby in conventional and well known manners and by well known equipment. However, as shown in FIGS. 4 and 6, which depict the windrow door 52 in an open position with spreader 26 disposed in its windrowing position, when windrow door 52 is open the crop residue flow to the distribution chamber 60 can directly exit the combine 20 through the rear opening 54 (FIG. 4) so as to be deposited directly onto a field in a windrow, as illustrated by arrows G.

As has been previously noted hereinabove, when the windrow door 52 is closed, as depicted in FIGS. 1 and 5, to effect swath spreading, users typically desire for the crop residue to be distributed evenly or uniformly over the swath, for a variety of purposes, important among which is uniform emergence of subsequently planted crops, and uniform application of chemicals and fertilizers onto the field. Consequently, especially for spreaders that employ counter-rotating paddles for throwing the crop residue sidewardly in an extended swath, it is preferred that the flow being directed to the spreader be concentrated towards the center of the residue spreader for optimum spreader performance.

Figure 6:
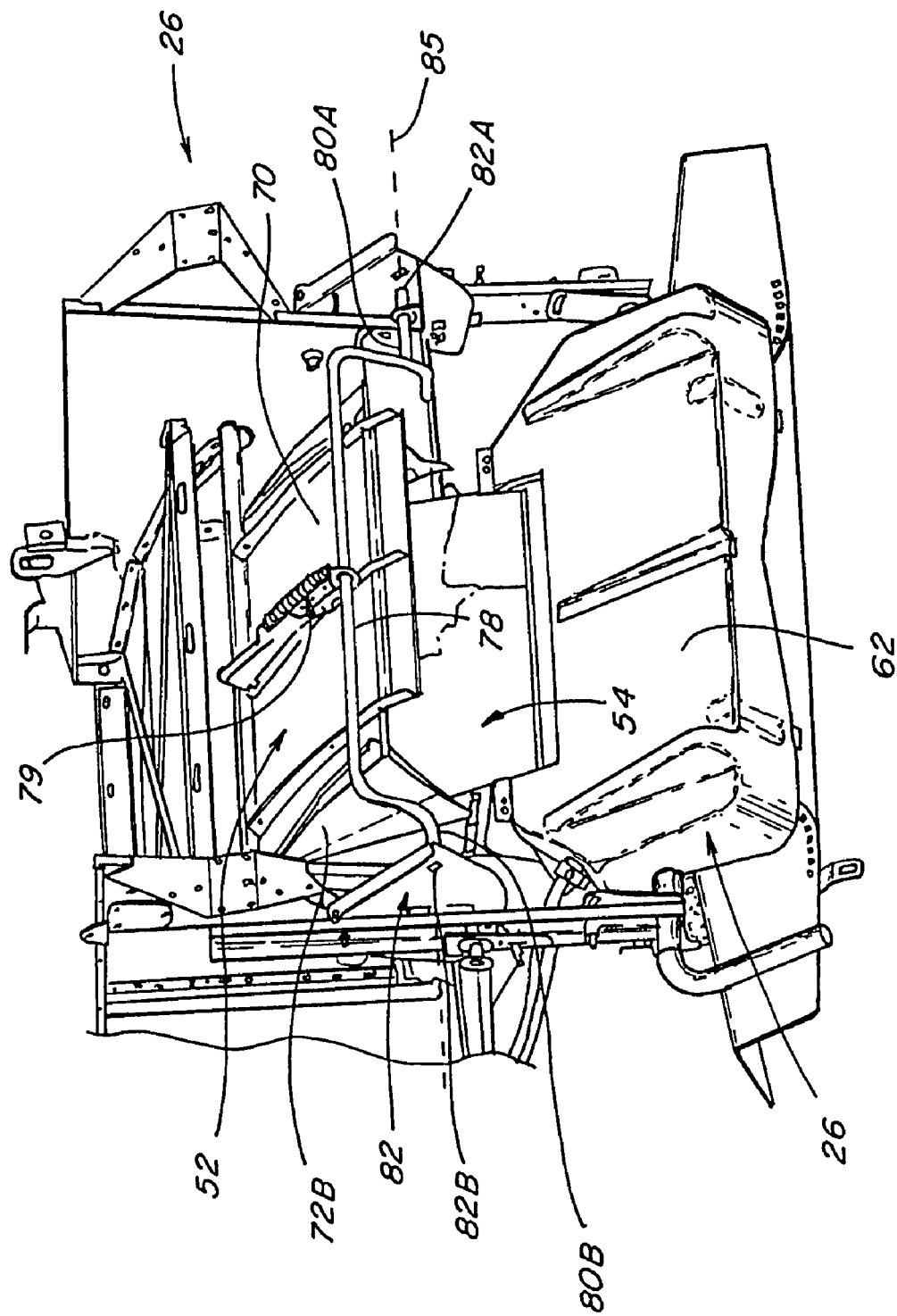
FIG. 6 is a rear perspective view showing the windrow door is an open position with the spreader in its windrowing position.

When windrow door 52 is opened, however, as depicted in FIGS. 4 and 6, crop residue is permitted to flow through the rear or exit opening 54 for deposit as a windrow behind the combine 20 upon the field, and as has also been previously noted, users then typically desire that the windrow flow of crop residue be distributed about a center line through the rear opening to facilitate the formation of a cohesive windrow. In general, the windrowing occurs when windrow door 52 is opened to permit the crop residue flow to be expelled from the combine 20 through rear opening 54 over the top of and past the spreader 26 and onto a ramp 62 extending downwardly and rearwardly over the rear end of the spreader 26. If the crop flow is sufficiently large, it will be reduced in overall vertical extent or funneled by passage through rear opening 54 so as to exit the rear end of the combine essentially in the form of a continuous, largely cohesive mat. This mat of crop residue will flow or ride downwardly and rearwardly over ramp 62 and be laid as a cohesive windrow onto the stubble of the harvested field behind the combine 20.

Figure 7:
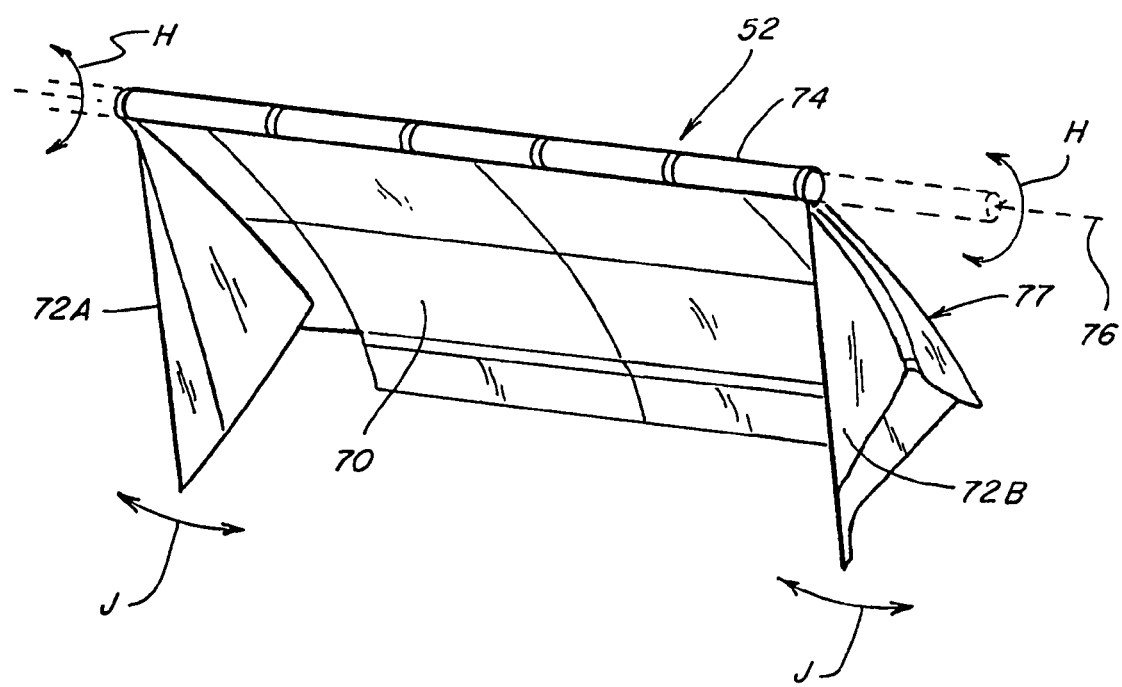
FIG. 7 is a perspective view from the right front of a windrow door construction.

With reference now to FIGS. 5-7, windrow door 52 preferably includes a door or guide arrangement including at least one door portion 70, door side panels 72A and 72B, and a generally horizontal rotational coupling 74 having an axis of rotation 76 about which the door portion 70 and the door side panels 72A and 72B can rotate as a unit 77, as illustrated by arrows H in FIG. 7. As best shown in FIGS. 5-6, such windrow door 52 further includes a windrow door pivot tube 78 operatively connected to door portion 70, as by known connector assembly 79, and also connected at opposite ends 80A and 80B thereof to the discharge housing 82 at pivot points 82A and 82B at the sides of combine 20, and one or more handles 84 for manual operation of the door portion 70 to open and close the windrow door 52 and to reveal and occlude the rear opening 54 (FIGS. 4 and 6). Such windrow door elements may take various known forms and configurations, and, except as may otherwise be addressed hereinafter, such as with regard to optional, adjustable side door panels of the windrow door, which will be addressed further hereinafter, the construction, interconnection, and operation of such elements will be well understood by those knowledgeable in the art. In summary, as handle 84 is operated by a user, windrow door pivot tube 78 is caused to rotate about an axis of rotation 85 through pivot points 82A, 82B, as illustrated by arrows I in FIGS. 5 and 6, and to effect pivotal movement of windrow door 52 about axis of rotation 76, as illustrated by arrows H in FIG. 7, to open and close windrow door 52.

It should be appreciated that the windrow door 52 could also be remotely automatically, electronically, hydraulically, or mechanically operable and positionable. For instance, door portion 70 could be controllably positioned to a desired state through the use of a common commercially available rotary actuator, a linkage arrangement, or the like (not shown).

Figure 8:
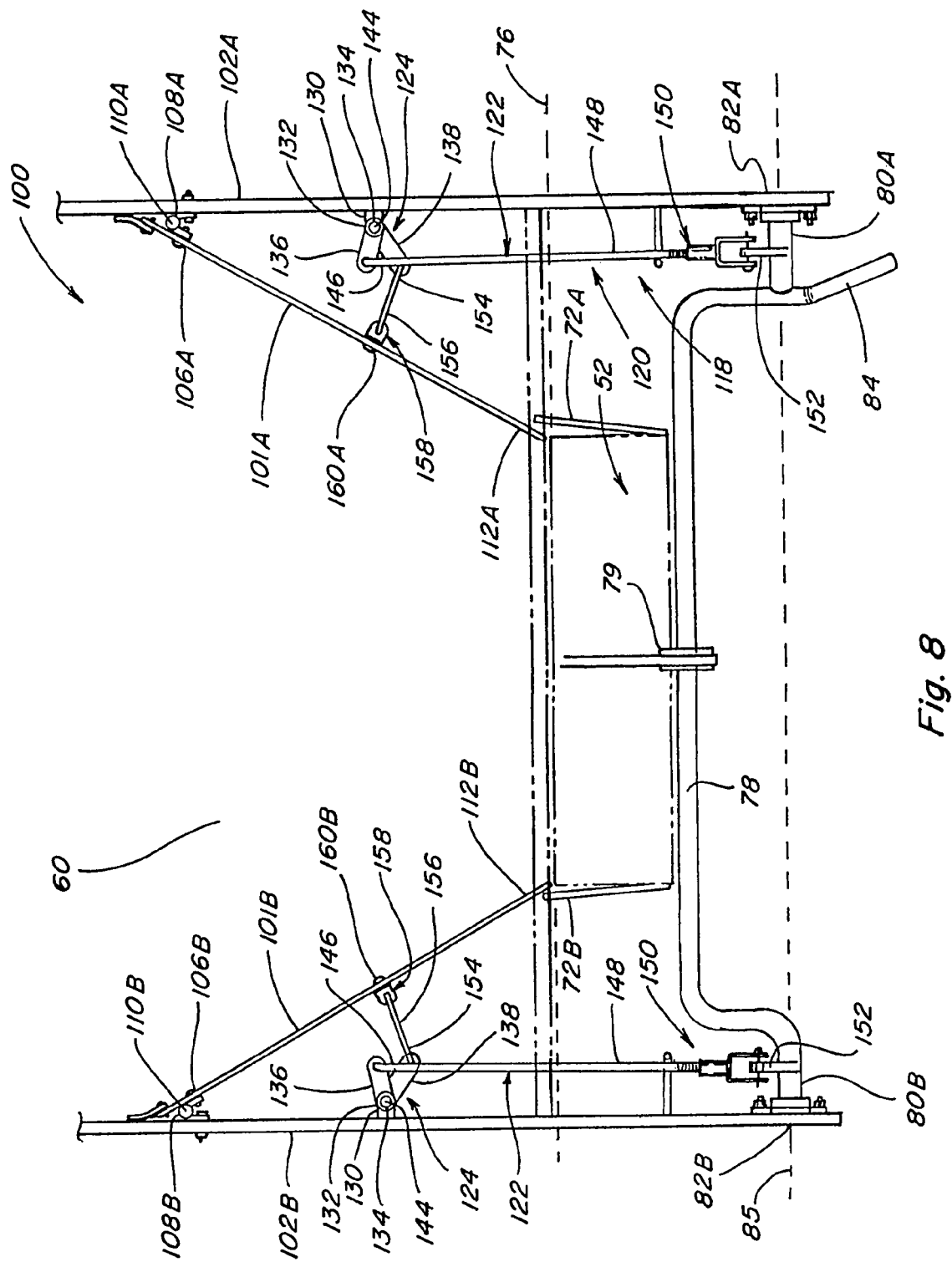
FIG. 8 is a top representational view of a convergence panel construction of the present invention with the windrow door closed.
Figure 9:
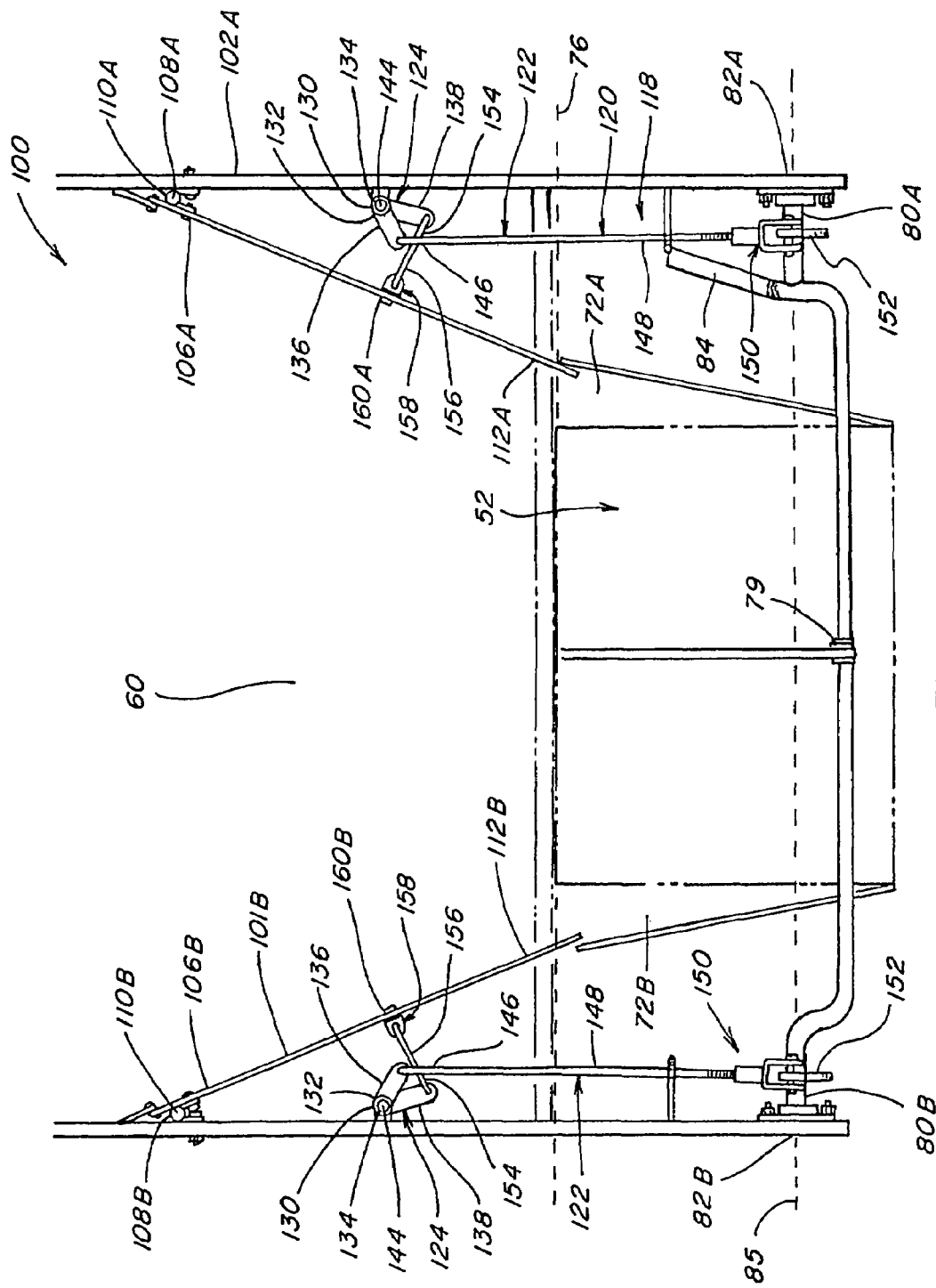
FIG. 9 is a top representational view of the convergence panel construction of FIG. 6 with the windrow door open.

FIGS. 8 and 9 are top, representational views, with various structural portions of the distribution chamber housing deleted for the sake of clarity and understanding of the present invention, depicting a convergence panel embodiment according to the present invention, with the windrow door 52 shown closed in FIG. 8 and open in FIG. 9. The convergence panel construction 100 of such embodiment includes right and left convergence panels 101A and 101B extending generally adjacent the side walls 102A and 102B of the distribution chamber 60 and having front or leading end portions 106A and 106B pivotally or hingedly attached to respective side walls 102A and 102B at rotation points 108A and 108B. As the right and left convergence panels 101A and 101B are caused to rotate about generally vertical axes of rotation 110A and 110B through rotation points 108A and 108B, the trailing or rear end portions 112A and 112B of convergence panels 101A and 101B are caused to move toward or away from one another, thereby narrowing or expanding the channel defined by the convergence panels 101A and 101B and the exit therefrom.

Figure 11:
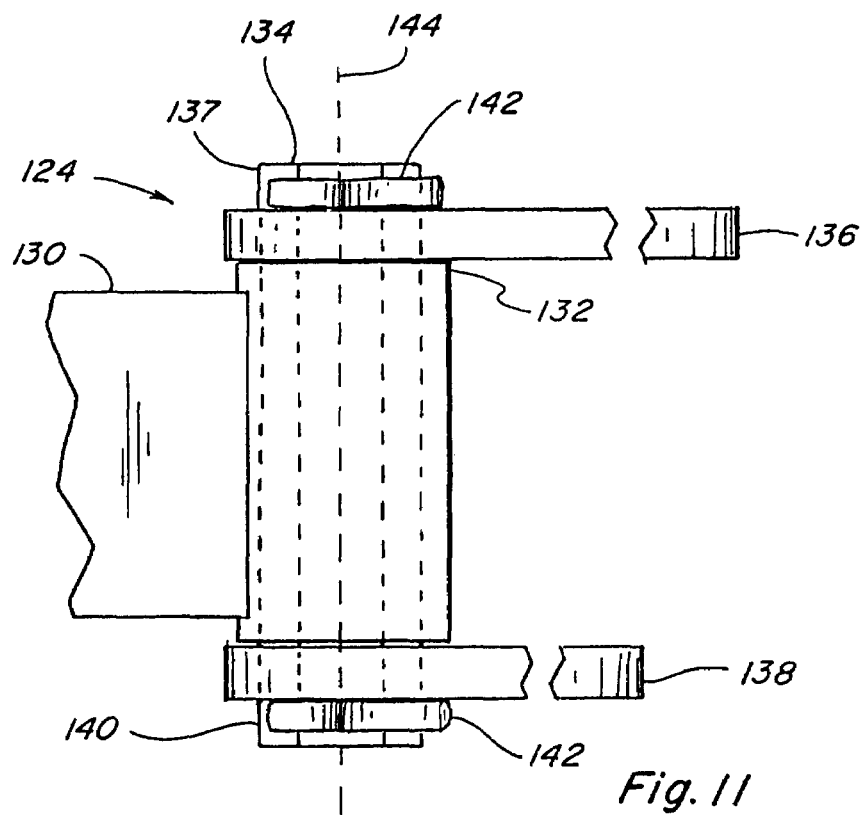
FIG. 11 is a view of the pivot assembly of FIG. 10 taken along cut 11-11.
Figure 10:
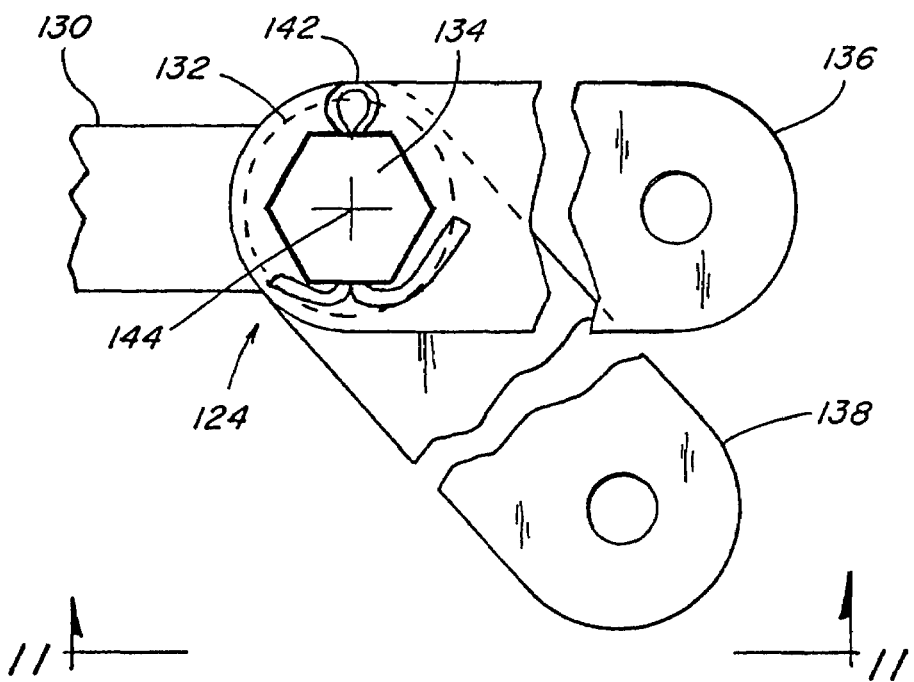
FIG. 10 is an enlarged top view of the pivot assembly attached to side wall 102B in FIG. 8.

In the convergence panel construction depicted in FIGS. 8-9, movement of the right and left convergence panels 101A and 101B is controlled through an adjustment mechanism 118 that includes a linkage assembly 120 connected to windrow door pivot tube 78, which linkage assembly 120 includes like mirror-imaged linkage mechanisms 122 associated, respectively, with right convergence panel 101A and side wall 102A of distribution chamber 60 and with left convergence panel 101B and side wall 102B of distribution chamber 60. Such linkage mechanisms 122 include a pivot assembly 124 connected to a side wall 102A or 102B of the distribution chamber 60, which pivot assembly, as best shown in FIGS. 10-11, includes a base portion 130 attached to the side wall, such as side wall 102A or 102B, a generally vertically oriented rounded flange or upper collar 132 for receiving a shaft 134 insertable extending therethrough, a control arm link 136 mounted on the shaft 134 at one end 137 thereof and a panel adjustment arm link 138 mounted on the shaft 134 at the other end 140 thereof, and pins 142 for maintaining the shaft 134 within the collar 132. In such embodiment, the shaft 134 is depicted as a hex shaft, but may also be keyed or otherwise configured to facilitate the mounting of the arm links 136 and 138 on the shaft 134 and the journaled movement or rotation of the shaft 134 and mounted arm links 136 and 138 about axis of rotation 144.

As best shown in FIGS. 8-9, control arm link 136 is connected to one end 146 of a generally horizontally extending throw link 148, the opposite end 149 of which is linked through a throw connector assembly 150, such as a throw rod or arm 152, to the windrow door pivot tube 78, near an end 80A or 80B thereof. As windrow door pivot tube 78 is caused to rotate about axis 85 through pivot points 82A and 82B, throw rod 152 is also caused to rotate about axis 85 and to effect, through connector assembly 150, fore and aft, generally horizontal, movement of the throw link 148, and resultant movement of the control arm link 136 and panel adjustment arm link 138 mounted on shaft 134 about axis of rotation 144.

Panel adjustment arm link 138 is connected to one end 154 of panel connector link 156, the opposite end of which is connected by any suitable connector construction 158 to the right or left convergence panel 101A or 101B at connection points 160A and 160B. As panel adjustment arm link 138 on shaft 134 is caused to rotate about axis of rotation 144, panel connector link 156 is moved, resulting in application of force at connection point 160A or 160B to effect rotational movement of the right or left convergence panel 101A or 101B about respective axes of rotation 108A and 108B.

Depending upon the particular designs and configurations of the windrow doors and windrow door pivot tubes employed, as well as the characteristics of various combines, distribution chambers, and convergence panel linkage assemblies that may be employed in any particular application, the throw connector assembly 150 may take many forms. In a simple form, where the requisite fore and aft movement of the throw link 148 can be effected by matching corresponding rotational movement of the windrow door pivot tube 78 to effect the opening and closing of the windrow door 52, the throw connector assembly 150 may conveniently comprise a throw rod or arm connected at its one end to the windrow door pivot tube 78, such as by welding, and connected by a link pin at its other end to throw link 148.

Figure 12:
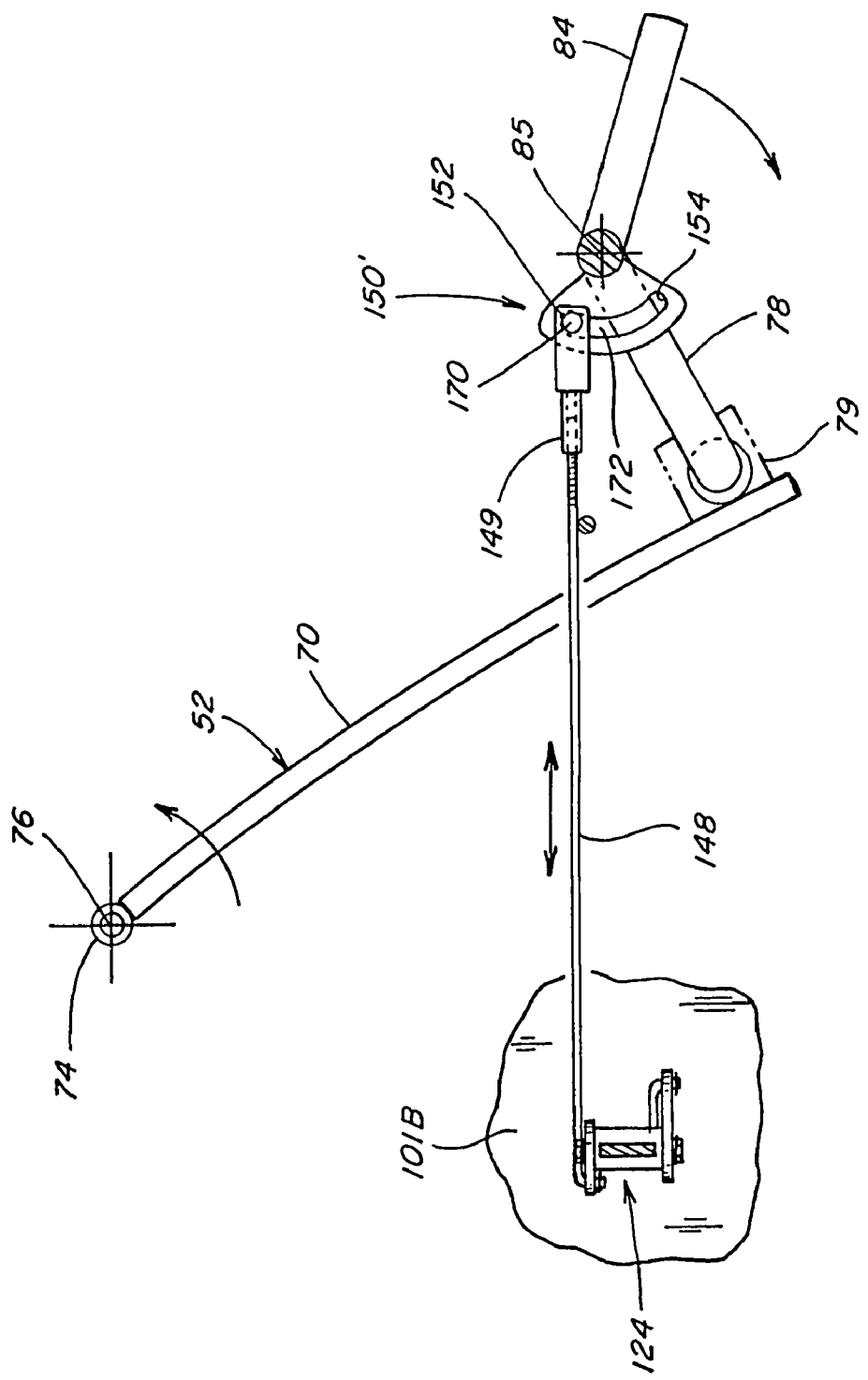
FIGS. 12-13 are generic representational depictions of a type of connector assembly that could be employed for translating large rotational movement of the windrow door pivot tube to more limited translational movements of associated linkage elements of a linkage mechanism, with FIG. 12 depicting the windrow door in a closed position and FIG. 13 depicting the windrow door in an open position.
Figure 13:
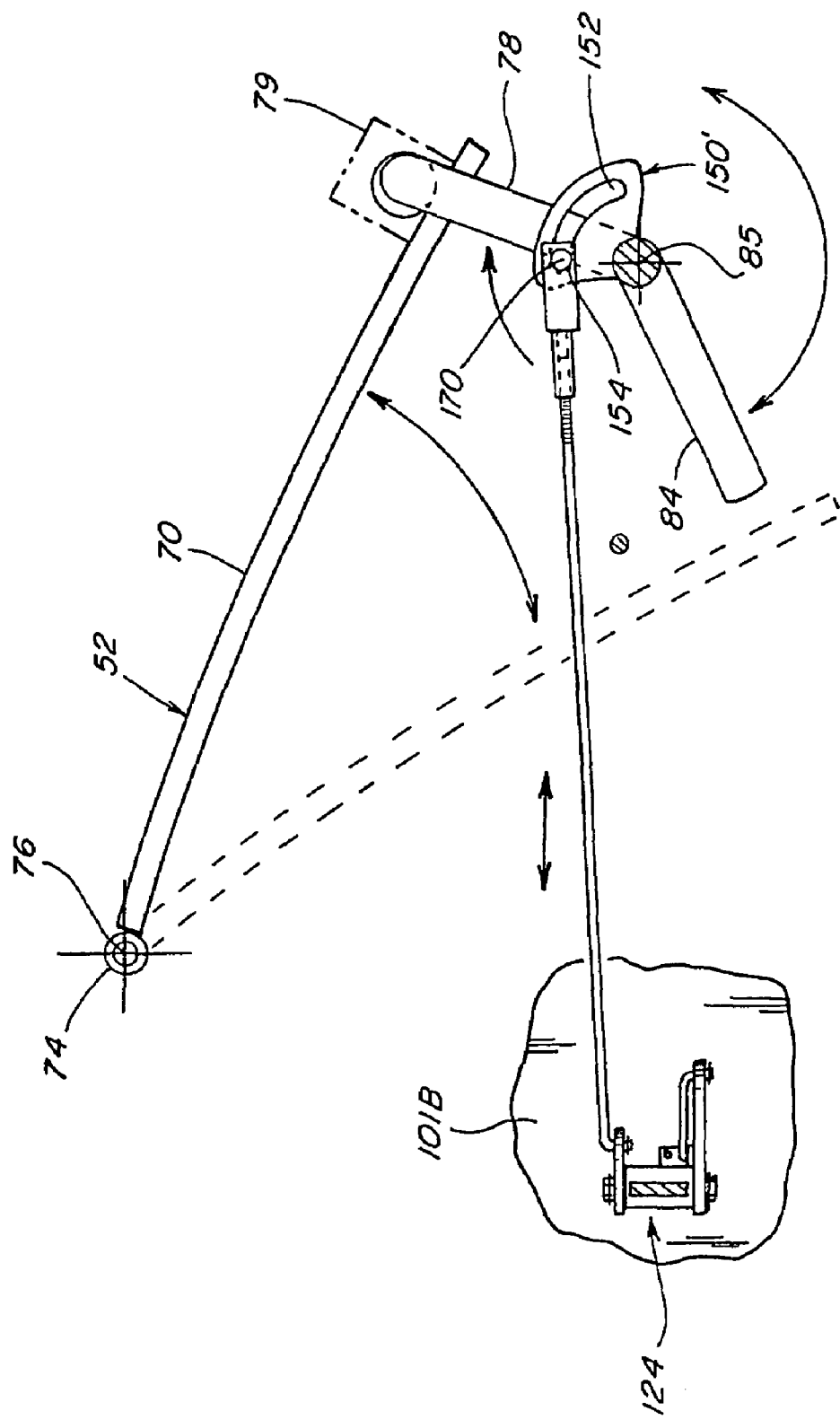

In other instances, such as when it may be desired that a significant degree of rotational movement of the windrow door pivot tube will result in limited fore and aft movement of a throw link, such as throw link 148, the throw connector assembly may take other convenient and well known forms, including forms that translate large rotational movements to more limited translational movements, including through the use of pin and slot features and arrangements as part of the connector assembly, such as the pin and slot features and arrangement as depicted representationally in FIGS. 12-13, wherein, for purposes of clarity in explaining the present invention, various structural details of the windrow door and its components, including the connector assembly 79, are not shown, and wherein, as windrow door pivot tube 78 is caused to rotate about axis 85 to open or close windrow door 52, connector assembly 150' likewise rotates about axis 85, with pin 170 at end 149 of throw link 148 riding along slot 172 in connector assembly 150' between end stops 152 and 154 thereof. When connector assembly 150' is rotated sufficiently that pin 170 has reached an end stop 152 or 154, further rotation of connector assembly 150' will effect fore and aft movement of throw link 148 and corresponding movement of right and left convergence panels 101A and 101B, as has previously been discussed.

Other elements of the linkage assembly could likewise be modified or adapted depending upon the particular equipment utilized and desires of the user. For example, although the embodiment described hereinabove employs generally like linkage mechanisms 122 for controlling the right and left convergence panels 101A and 101B, the linkage mechanisms need not be the same, and could provide for different degrees of movement of the right and left convergence panels. Additionally, while it is generally preferred that the convergence panels 101A and 101B be adjusted in response to a single control input, such as the operator manually operating an open/close lever for opening and closing the windrow door 52 through a rotation of the windrow door pivot tube 78, the linkage mechanisms for the right and left convergence panels 101A and 101B could be separately or independently operable to effect the desired results.

Figure 14:
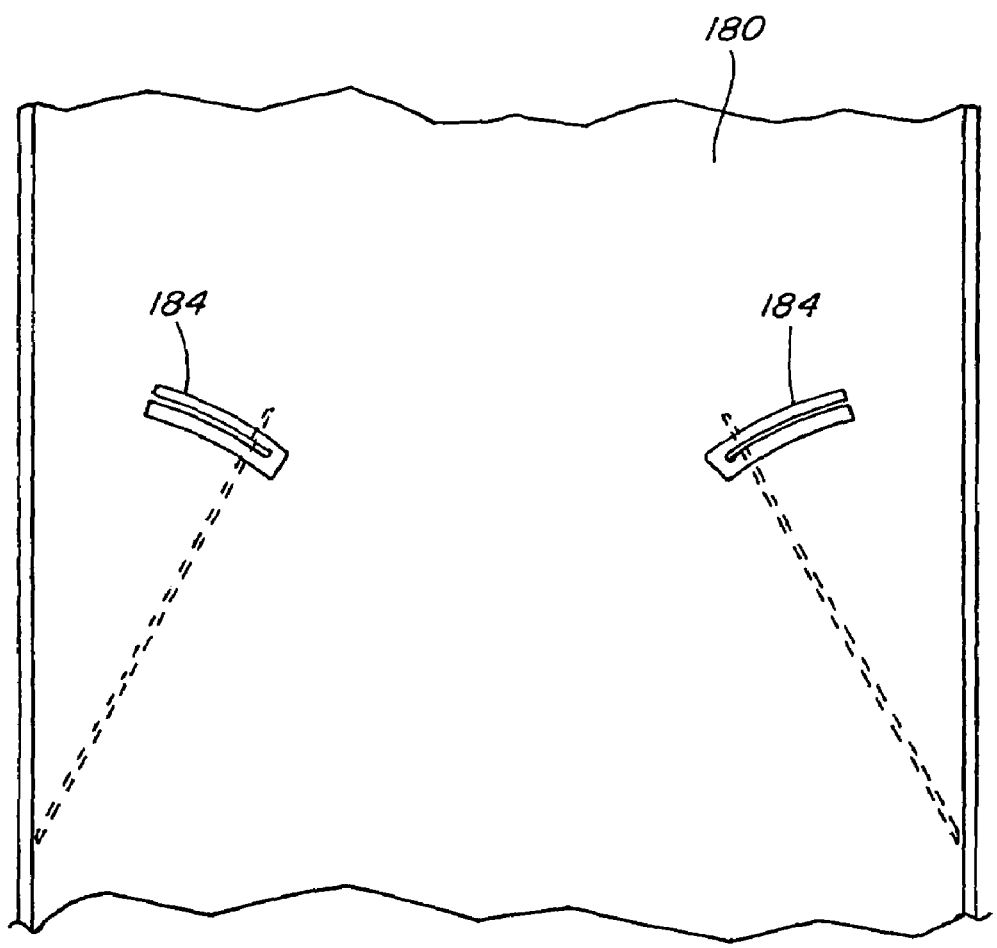
FIGS. 14 and 15 depict optional representative complementarily engageable guide elements for the adjustable convergence panels and the top of distribution chamber.
Figure 15:
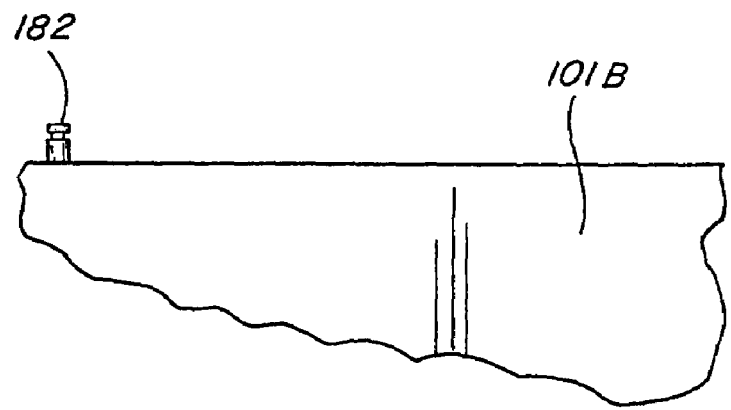

Optionally, as depicted in FIGS. 14-15, the right and left convergence panels 101A and 101B and the top 180 of the distribution chamber 60 may include complementarily engageable panel guide elements or features, such as, by way of example and not of limitation, guide pins or projections 182 at the tops of such panels and guide rails or slots 184 in or at the top 180 of distribution chamber 60 for receiving and guiding the guide projections 182 as the convergence panels are moved about the axes of rotation 110A and 110B. Such guide elements or features may take many various forms and be of well known constructions, depending upon the design characteristics and features of the distribution chamber and the convergence panels employed.

Figure 16:
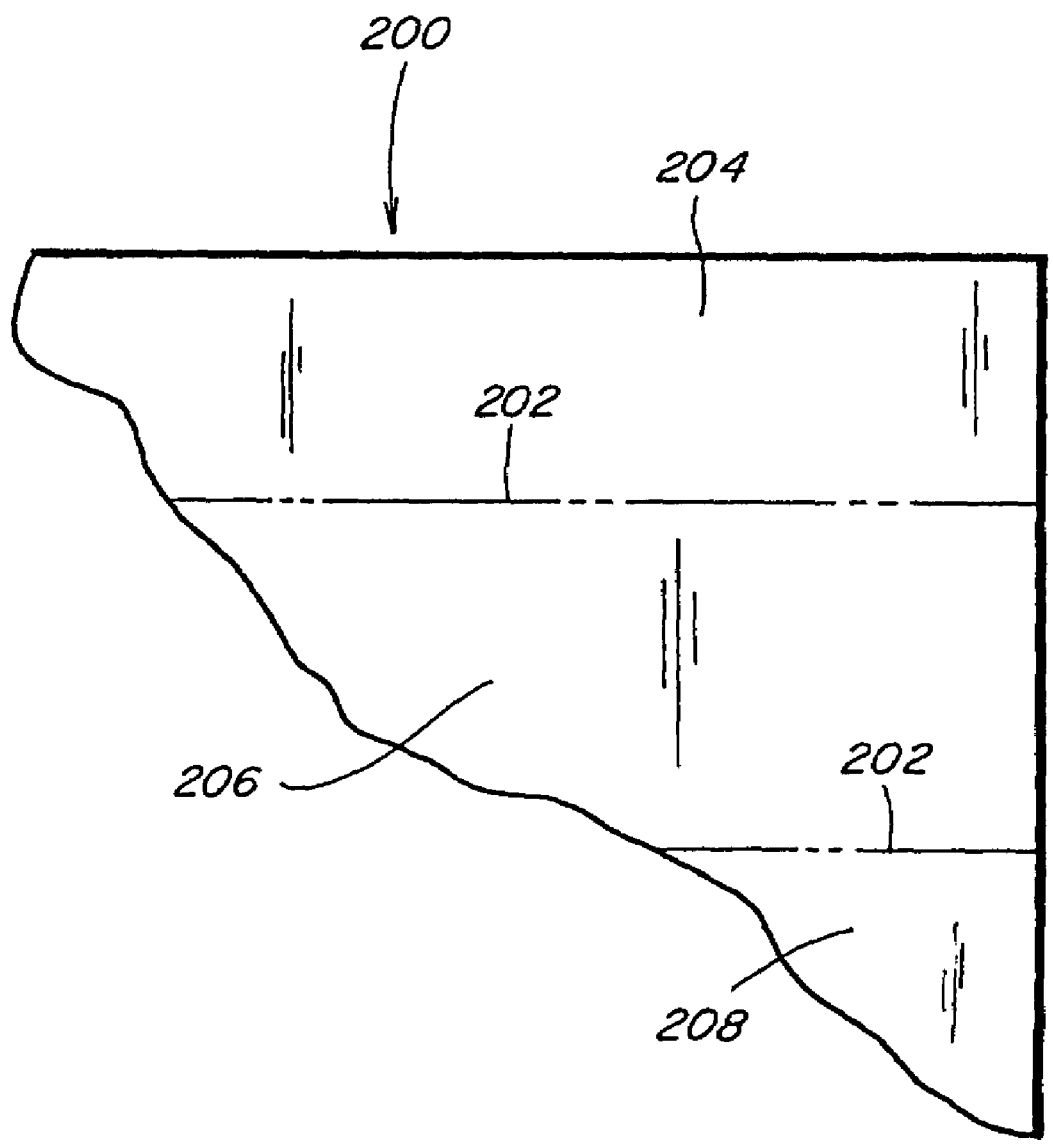
FIG. 16 depicts a portion of an optional convergence panel that includes two (2) similar generally horizontal hinge joints that extend along the length of the convergence panel.

Additionally, the convergence panels may optionally include one or more hinge joints along their lengths to permit the exit opening from the convergence panels to be configured to have various geometric shapes. In such regard, FIG. 16 depicts a portion of a convergence panel 200 that includes two (2) similar generally horizontal hinge joints 202 extending along the length of the convergence panel 200, which hinge joints serve to define boundaries between an upper panel portion 204, a middle panel portion 206, and a lower panel portion 208, with the middle panel portion 206 being attached to a side wall of the distribution chamber at rotation point 108A or 108B (FIGS. 8-9).

Figure 17:
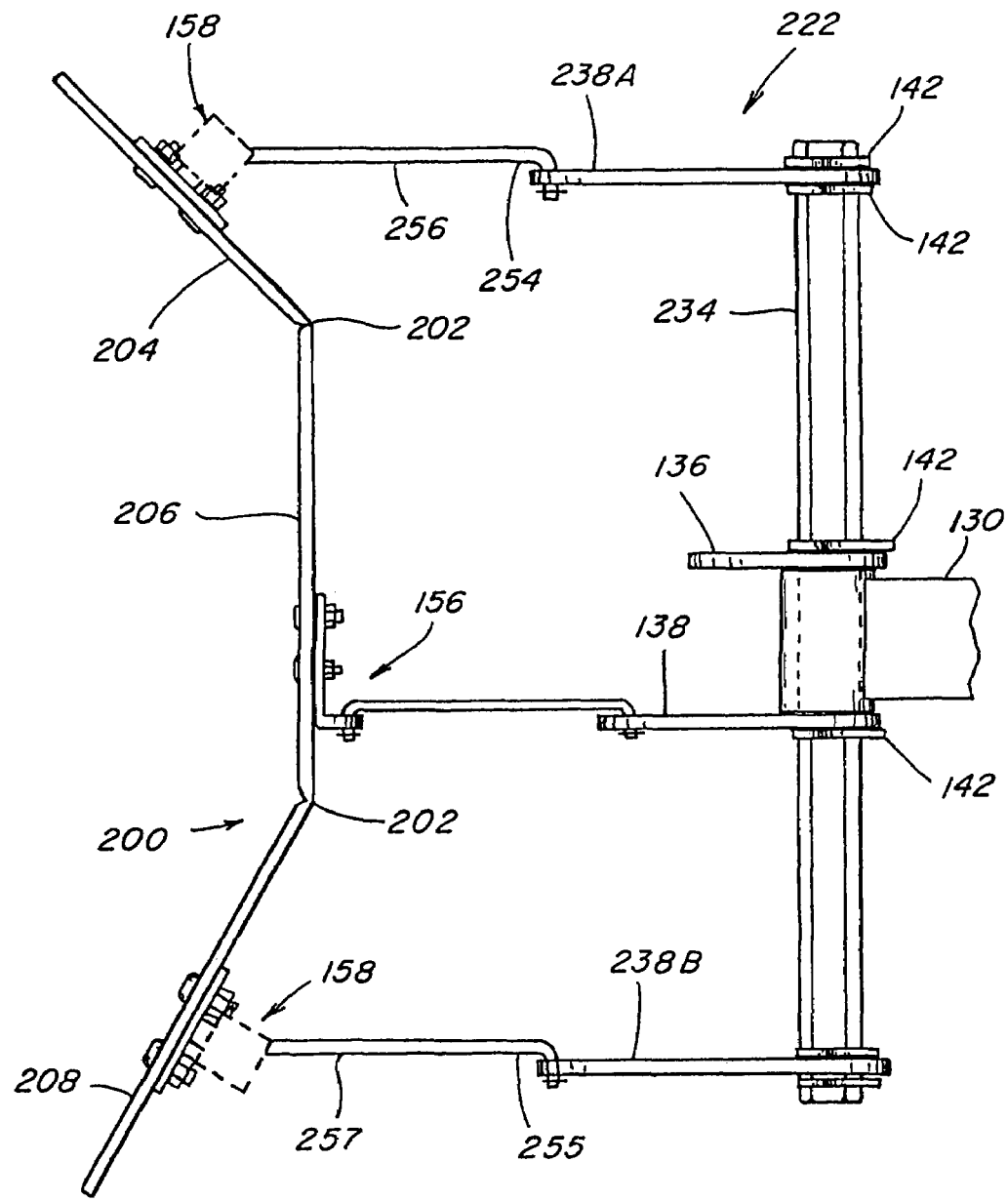
FIG. 17 depicts a portion of a linkage mechanism that could be utilized with convergence panels of FIG. 16 to effect exits of different cross-sectional shapes from the convergence panels.

FIG. 17 depicts a portion of a linkage mechanism 222 that could be employed with such convergence panel 200, which linkage mechanism 222 is similar in many respects to the linkage mechanism 122, with panel adjustment arm link 138 operatively connected to middle panel portion 206 to control movement thereof, but employing an extended shaft 234, of similar cross-sectional design to shaft 134, in place of shaft 134, with additional upper and lower panel adjustment arm links 238A and 238B mounted on the extended shaft 234 near the opposite ends thereof.

The upper panel adjustment arm links 238A can be connected to one end 254 of an upper panel link connector 256 and lower panel adjustment arm links 238B can be similarly connected to one end 255 of a lower panel link connector 257. The opposite ends of the upper and lower panel link connectors 238A and 238B can be connected by any suitable connector construction 158, which could, by way of example and not of limitation, include various ball and socket or universal joint or other arrangements, to the upper and lower portions 204 and 208 of panel 200. Preferably, the constructions including the upper and lower panel adjustment arm links 238A and 238B and the upper and lower panel link connectors 256 and 257 are sized similarly to one another but differently from the construction including the panel adjustment link 138 and panel connector 156 so that operation of the control arm link 136 as the windrow door 52 is closed will effect a rotational movement of the panel 200 about the axis of rotation near its front end and a hinged movement of the upper and lower panel portions 204 and 208 about hinge joints 202. Depending upon the amount of movement desired for the convergence panels and the various portions thereof, the exit opening can thus be readily configured to have a hexagonal or octagonal shape with a panel such as convergence panel 200 or other shapes with convergence panels having different numbers and arrangements of hinged joints.

Figure 18:
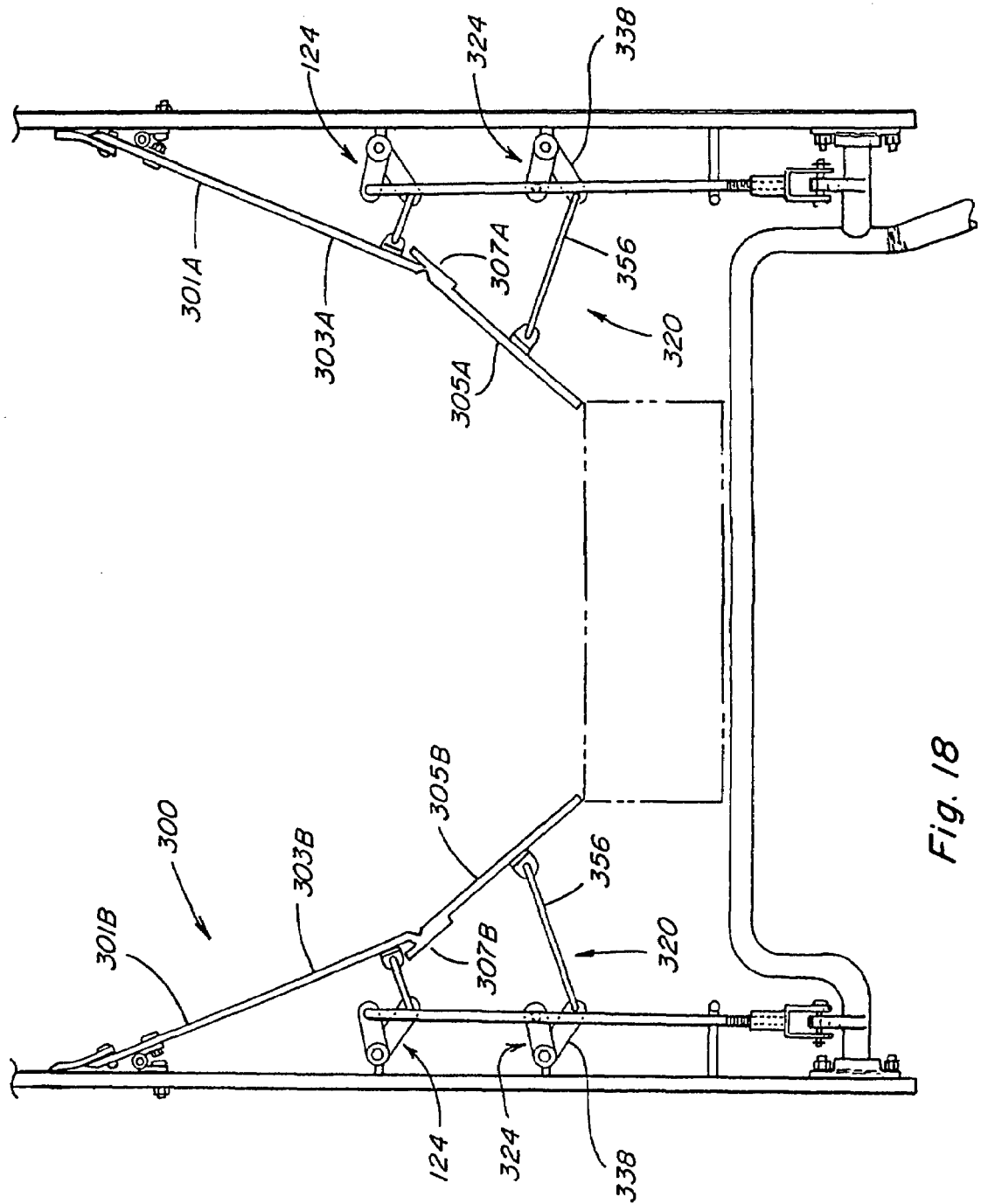
FIG. 18 depicts a convergence panel construction generally similar to that of FIG. 8 but wherein the individual convergence panels include overlapped sections and depicting a linkage mechanism for effecting the adjustment of such sections of the convergence panels.

Somewhat similarly, the convergence panels may include one or more jointed or overlapped portions along their extents, which portions may be adjustably configured to provide further or additional channeling of the crop residue. For example, FIG. 18 depicts in a somewhat generic fashion a convergence panel construction 300, similar in many respects to the convergence panel construction 100, with right and left convergence panels 301A and 301B that have front panel portions 303A and 303B, rear panel portions 305A and 305B, and overlap or joinder areas 307A and 307B. Preferably, the front panel portions 303A and 303B will be mated or joined to the rear panel portions 305A and 305B, such as by a hinged joint at the overlap or joinder areas 307A and 307B, but, depending upon the equipment being used and the desires of a user, the inner sides of rear portions 305A and 305B may be positioned and configured to abut the outer sides of front portions without any joint or mating construction, and the front ends of the rear portions 305A and 305B could optionally, like the front ends of the front portions 303A and 303B, be hingedly or pivotally attached the side walls 102A and 102B of distribution chamber 60. The linkage assembly 320 for such convergence panel construction could be similar in many respects to linkage assembly 120, but each linkage mechanism could employ an additional pivot assembly 324 which is essentially the same as pivot assembly 124 except for a differently sized panel adjustment arm link 338 and/or panel connector link 356, the different sizes of which will result in a different amount of movement between the panel portions 303A, 303B and 305A, 305B.

Especially when the convergence panels are formed of multiple portions or sections, as with convergence panels 301A and 301B, different materials may be employed for the different portions or sections. In such regard, the use of alternating materials, such as, by way of illustration and not of limitation, steel and rubber, can provide convergence panels that are somewhat flexible and which permit the smooth flow of crop residue therealong. Such flexibility may be particularly advantageous when tolerances are tight and in situations where irregularities in fit occur over the course of time, such as due to wear and tear from use.

Preferably, the windrow door side panels 72A and 72B will be attached to the door portion 70 of windrow door 52 or otherwise form part of the windrow door 52 so as to be sidewardly movable or adjustable or expandible to a degree, as illustrated by the arrows J in FIG. 7, when sidewardly directed pressure is applied thereto, and the right and left convergence panels 101A and 101B will extend to be approximately adjacent to the forward portions of the interior sides of such door side panels 72A and 72B, as shown in FIGS. 8-9. Somewhat similarly, adjustable spreader infeed panels could be provided in the spreader feed area and configured somewhat similarly to the windrow door side panels to overlap the convergence panels so as to define a converging channel passageway to the spreader when swath spreading is desired by a user.

Although the convergence panel construction of the present invention has hereinabove been discussed and described primarily for use with a combine that has an operable windrow door for opening and closing a rear opening through which the crop residue would pass for windrowing, it has been pointed out that windrowing can also be effected with some combines by moving the chopper/spreader to a position such that the residue flow will not enter the chopper/spreader, which could then result in the formation of a windrow in front of the chopper/spreader. With such a combine system, a guide flow mechanism may be employed in place of the windrow door for selectively effecting the discharge of the crop residue from the distribution chamber for windrowing or for input into the spreader feed area of the chopper/spreader for spreading thereby, which guide flow mechanism will be operable to move the spreader and its spreader feed area out of the discharge flow path from the distribution chamber when a user desires to effect a windrowing operation and operable to move the spreader and its spreader feed area into the discharge flow path from the distribution chamber when the user desires to effect spreading by the spreader. The positioning assembly employed may be similar to the assemblies discussed and described hereinabove, and operation of linkage mechanisms of the positioning assembly to movably adjust the convergence panels can be made responsive to manual operations by a user of an operator handle or control for the guide flow mechanism instead of the operator handle of the windrow door pivot tube. In light of all the foregoing, the modifications and changes to effect such a convergence panel construction can be readily accomplished by those skilled in the art without the need for further detailed description, and various of the options and additional features that have been addressed in describing the various convergence panel constructions hereinabove for use with combines having windrow doors could likewise be employed with combines that employ flow guide mechanisms instead of windrow doors for effecting windrowing operations.

In light of all the foregoing, it should thus be apparent to those skilled in the art that there has been shown and described an adjustable convergence panel construction that can be utilized to better direct and control the lateral flow concentration or dispersion of the crop residue flow of a combine, depending upon whether windrowing or swath spreading of crop residue is desired, as the crop residue flow is directed for discharge from the distribution chamber as a windrow or for discharge from the distribution chamber into the spreader for spreading in a swath on the field. However, it should also be apparent that, within the principles and scope of the invention, many changes are possible and contemplated, including in the details, materials, and arrangements of parts which have been described and illustrated to explain the nature of the invention. Thus, while the foregoing description and discussion addresses certain preferred embodiments or elements of the invention, it should further be understood that concepts of the invention, as based upon the foregoing description and discussion, may be readily incorporated into or employed in other embodiments and constructions without departing from the scope of the invention. Accordingly, the following claims are intended to protect the invention broadly as well as in the specific form shown, and all changes, modifications, variations, and other uses and applications which do not depart from the spirit and scope of the invention are deemed to be covered by the invention, which is limited only by the claims which follow.

What is claimed is:

1. A convergence panel construction for a combine having a distribution chamber into which crop residue is directed during operation of the combine and a windrow door, the distribution chamber having a top, opposed sides, a rear opening for the discharge of crop residue therethrough for windrowing upon a field, and a spreader feed area, the windrow door being associated with the rear opening and operably openable and closable to respectively open and close such rear opening, the combine operating to project crop residue towards the rear opening, the projected crop residue being projected through and expelled from the rear opening when the windrow door is open and being diverted towards the spreader feed area when the windrow door is closed, the convergence panel construction comprising a pair of convergence panels each extending generally longitudinally along a respective side of the distribution chamber, each of which convergence panels includes a front portion and a rear portion, an attachment construction associated with each said convergence panel and hingedly attaching said front portion thereof to a respective side wall of the distribution chamber to form a side hinge for rotationally moving said convergence panel about the axis of rotation of said side hinge within the distribution chamber, a panel positioning assembly operable to control the degree of rotation of said convergence panels about the axes of rotation of their respective side hinges and to position the convergence panels and their rear ends thereof relative to one another and to the rear opening of the distribution chamber, said positioned rear ends of said convergence panels defining an exit from said convergence panels, said positioning assembly including a controller portion operable by a user to selectively effect rotational movement of said convergence panels and their rear ends to narrow the exit from said convergence panels when the windrow door is closed and to expand the exit from said convergence panels when the windrow door is open, said narrowed exit when the windrow door is closed effecting convergence of the crop residue flow towards the center of the spreader feed area as such flow is diverted thereto, said expanded exit when the windrow door is open effecting a dispersion of the crop residue flow across the extent of the rear opening as the crop residue flow is being projected through and expelled from the rear opening for windrowing, wherein the windrow door includes a pair of windrow door side panels, the inner front end portions of the windrow door side panels overlapping the outer rear ends of said convergence panels, the windrow door side panels being adjustably movable in conjunction with said convergence panels as said convergence panels are positioned to define an expanded exit from said convergence panels, and wherein said convergence panels are movable to abut the windrow side panels when the windrow door is opened and to thereby effect coordinated movement of said convergence panels and the windrow side panels and to define a passageway from the distribution chamber through the rear opening.

2. The convergence panel construction of claim 1 wherein said positioning assembly includes a linkage assembly coupled to and responsive to operation of said controller for effecting the degree of rotation of said convergence panels about the axes of rotation of their respective side hinges and the positioning of the convergence panels and their rear ends thereof relative to one another and to the rear opening of the distribution chamber.

3. The convergence panel construction of claim 2 wherein said linkage assembly includes a linkage mechanism associated with each of said convergence panels.

4. The convergence panel of claim 3 wherein said linkage mechanisms are operable to independently effect the degree of rotation of each of said convergence panels about the axes of rotation of their respective side hinges and the positioning of the convergence panels and their rear ends thereof relative to one another and to the rear opening of the distribution chamber.

5. The convergence panel construction of claim 3 wherein said linkage mechanisms are operated in unison to commonly effect the degree of rotation of both of said convergence panels about the axes of rotation of their respective side hinges and the positioning of the convergence panels and their rear ends thereof relative to one another and to the rear opening of the distribution chamber.

6. The convergence panel construction of claim 3 wherein said linkage mechanisms are essentially mirror images of one another.

7. The convergence panel construction of claim 6 wherein said linkage mechanisms include a pivot assembly connected to a respective side wall of the distribution chamber, said pivot assembly including a shaft with a control arm link and a panel adjustment arm link mounted thereon, said control arm link and said panel adjustment link being angularly offset from one another as mounted on said shaft, said panel adjustment link operatively connected to a respective convergence panel, movement of said control arm link about the axis of said shaft effecting a corresponding movement of said panel adjustment link and effecting a rotational repositioning of the respective convergence panel to which said panel adjustment link is operatively connected about the axis of rotation of said side hinge of such respective convergence panel.

8. The convergence panel construction of claim 7 wherein the windrow door has associated therewith a windrow door pivot tube with an operating handle, such windrow door pivot tube operatively connected to the windrow door to effect the opening and closing of the windrow door upon operation of the operating handle by a user, and wherein said control arm link is operatively connected to the windrow door pivot tube, operation of the operating handle of the windrow door pivot tube effecting movement of said control arm link and resultant movement of said convergence panels.

9. The convergence panel construction of claim 8 wherein said linkage mechanisms are commonly responsive to operation of the operating handle of the windrow door pivot tube to effect rotational movement of said convergence panels and the rear ends thereof about the axes of rotation of their respective side hinges to define a narrow exit from said convergence panels when the windrow door is closed and to define an expanded exit from said convergence panels when the windrow door is opened.

10. The convergence panel of claim 3 wherein said linkage assembly is operable to shift the center of said exit from said convergence panels laterally.

11. The convergence panel construction of claim 1 wherein said convergence panels include a plurality of longitudinally adjoined sections extending successively from said front portions of said convergence panels towards said rear portions of said convergence panels.

12. The convergence panel construction of claim 11 wherein different sections of said convergence panels are of different materials.

13. The convergence panel construction of claim 11 wherein adjacent sections of said convergence panel are joined to one another to define a longitudinally positioned joint therebetween having a generally vertical axis of rotation and wherein said panel positioning assembly is operable to also control rotational disposition of each successive longitudinal section relative to the preceding longitudinally positioned joint.

14. The convergence panel construction of claim 13 wherein said positioning assembly includes generally like linkage mechanisms, each of which linkage mechanisms is associated with a respective convergence panel and is coupled to and responsive to operation of said controller for effecting the degree of rotation of said convergence panels about the axes of rotation of their respective side hinges and the rotational dispositions of said successive longitudinal sections of relative to the preceding longitudinally positioned joints.

15. The convergence panel construction of claim 14 wherein said convergence panels are of essentially like construction and wherein said linkage mechanisms each include a control arm link associated with each longitudinally adjoined section and an associated section adjustment arm link, each of said section adjustment arm links being operatively connected to a respective longitudinally adjoined section, movement of said control arm link associated with a respective longitudinally adjoined section effecting corresponding movement of the associated section adjustment arm link and said respective longitudinally adjoined section to which said section adjustment arm link is operatively connected, said successive longitudinally adjoined sections being rotatable further inwardly about the generally vertical axis of rotation of the preceding longitudinally positioned joint towards like sections of the convergence panel at the opposite side of the distribution chamber.

16. The convergence panel construction of claim 11 wherein successive sections of said convergence panel overlap preceding sections of said convergence panels, wherein said positioning assembly includes generally like linkage mechanisms, each of which linkage mechanisms is associated with a respective convergence panel and is coupled to and responsive to operation of said controller for effecting the degree of rotation of said convergence panels about the axes of rotation of their respective side hinges and the positionings of said longitudinally adjoined sections of said convergence panels, said linkage mechanisms each including a control arm link associated with each longitudinally adjoined section and an associated section adjustment arm link, each of said section adjustment arm links being operatively connected to a respective longitudinally adjoined section, movement of said control arm link associated with a respective longitudinally adjoined section effecting corresponding movement of the associated section adjustment arm link and said respective longitudinally adjoined section to which said section adjustment arm link is operatively connected, said overlap limiting the movement of the forward ends of the successive longitudinally adjoined sections and maintaining said longitudinally adjoined sections in overlapping abutment with preceding sections to define a channel passageway through the distribution chamber.

17. The convergence panel construction of claim 1 wherein said convergence panels and the top of the distribution chamber include complementarily engageable guide positioning elements for guiding and facilitating rotational movements of said convergence panels about the axes of rotation of their respective side hinges, said complementarily engageable elements forming a positioning guide portion.

18. The convergence panel construction of claim 17 wherein said positioning guide portion includes guide pins at the tops of the convergence panels and guides along the top of the distribution chamber for engageably receiving said guide pins.

19. A convergence panel construction for a combine having a distribution chamber into which crop residue is directed during operation of the combine and from which the crop residue is discharged for either windrowing or spreading by a spreader, a guide flow mechanism associated therewith for selectively effecting the discharge of the crop residue from the distribution chamber for windrowing or for input into the spreader feed area of a spreader for spreading thereby, the guide flow mechanism operable to move the spreader and its spreader feed area out of the discharge flow path from the distribution chamber to effect windrowing or to move the spreader and its spreader feed area into the discharge flow path from the distribution chamber to effect spreading by the spreader, the convergence panel construction comprising a pair of convergence panels each extending generally along a respective side of the distribution chamber, each of which convergence panels includes a leading portion and a trailing portion and whose leading portion is hingedly attached to the respective side wall of the distribution chamber to form a side hinge for rotationally moving said convergence panel about the axis of rotation of said side hinge within the distribution chamber, a positioning assembly operable to control the degree of rotation of said convergence panels about said hinged attachment and to position the convergence panels and their trailing ends thereof relative to the discharge flow path from the distribution chamber, said positioned trailing ends of said convergence panels defining an exit from said convergence panels, said positioning assembly including a controller portion operable by a user to selectively effect rotational movement of said convergence panels and their trailing ends to narrow the exit from said convergence panels when the spreader is moved into the discharge flow path from the distribution chamber and to expand the exit from said convergence panels when the spreader is moved out of the discharge flow path from the distribution chamber, said narrowed exit when the spreader is moved into the discharge flow path from the distribution chamber effecting convergence of the crop residue flow towards the center of the spreader feed area as such flow proceeds thereto, said expanded exit when the spreader is moved out of the discharge flow path from the distribution chamber effecting a dispersion of the crop residue flow across the extent of said expanded exit as the crop residue flow is crop residue is being projected from the combine for windrowing, wherein at least one of said convergence panels includes a generally horizontal hinged joint, an upper panel portion above said generally horizontal hinged joint, and a lower panel portion below said generally horizontal hinged joint, said positioning assembly operable to also control rotational disposition of said upper and lower panel portions relative to one another and said generally horizontal hinged joint.

20. The convergence panel construction of claim 19 wherein said convergence panels are of generally like construction.

21. The convergence panel construction of claim 20 wherein said convergence panels each include a plurality of generally horizontal hinged joints and intermediate panel portions between each pair of generally horizontal hinged joints, said upper panel portion being above the uppermost of said generally horizontal hinged joints, said lower panel portion being below the lowermost of said generally horizontal hinged joints, said positioning assembly operable to further control rotational disposition of the panel portions adjoining each generally horizontal hinged joint relative to said adjoined generally horizontal hinged joint.

22. The convergence panel construction of claim 21 wherein said positioning assembly includes a linkage assembly coupled to and responsive to operation of said controller for effecting the degree of rotation of said convergence panels about the axes of rotation of their respective side hinges, the rotational dispositions of panel portions adjoining each generally horizontal hinged joint relative to said adjoined generally horizontal hinged joint, and the positionings of said upper, intermediate, and lower panel portions and their rear ends thereof relative to one another and to the rear opening of the distribution chamber, said positionings of said upper, intermediate, and lower panel portions and their rear ends thereof defining the geometrical shape of said exit.

23. The convergence panel construction of claim 22 wherein said positioning assembly includes generally like linkage mechanisms, each of which linkage mechanisms is associated with a respective convergence panel and is coupled to and responsive to operation of said controller for effecting the degree of rotation of said convergence panels about the axes of rotation of their respective side hinges, the rotational dispositions of panel portions adjoining each generally horizontal hinged joint relative to said adjoined generally horizontal hinged joint, and the positionings of said upper, intermediate, and lower panel portions and their rear ends thereof relative to one another and to the rear opening of the distribution chamber.

24. The convergence panel construction of claim 23 wherein said linkage mechanisms each include a control arm link and a plurality of panel portion adjustment arm links, each of said panel portion arm links being operatively connected to a respective upper, intermediate, or lower panel portion of a respective convergence panel, movement of said control arm link effecting corresponding movements of said plurality of panel adjustment arm links and said respective panel portions to which said panel adjustment arm links are operatively connected, said upper and lower panels portions being rotatable inwardly about the generally horizontal hinged joints to which they are adjoined towards said upper and lower panel portions of the convergence panel at the opposite side of the distribution chamber.

25. The convergence panel construction of claim 19 wherein said controller portion includes an operator control Operable by a user to move the spreader into or out of the discharge flow path from the distribution chamber.

* * * * *